United States Patent [19]

Rhum et al.

[11] 4,276,432

[45] Jun. 30, 1981

[54] LOW MOLECULAR WEIGHT ACRYLATES OR METHACRYLATES AND METHODS FOR THEIR PREPARATION

[75] Inventors: David Rhum, Westfield, N.J.; Patrick F. Aluotto, Cincinnati, Ohio

[73] Assignee: Celanese Corporation, New York, N.Y.

[21] Appl. No.: 794,866

[22] Filed: May 9, 1977

Related U.S. Application Data

[63] Continuation of Ser. No. 666,527, Mar. 12, 1976, Pat. No. 4,075,242, which is a continuation-in-part of Ser. No. 380,314, Jul. 18, 1973, abandoned, and Ser. No. 521,723, Nov. 7, 1974, abandoned.

[51] Int. Cl.$^3$ .................. C07C 69/54; C08F 2/06; C08F 20/12; C08F 20/14
[52] U.S. Cl. .................. 560/190; 428/522; 526/210; 526/320; 526/328
[58] Field of Search ............... 526/328, 210; 560/190

[56] References Cited

U.S. PATENT DOCUMENTS

| 3,026,307 | 3/1962 | Gorham et al. | 528/502 |
| 4,075,242 | 2/1978 | Rhum et al. | 526/89 |

*Primary Examiner*—Harry Wong, Jr.
*Attorney, Agent, or Firm*—Kenneth A. Genoni

[57] ABSTRACT

A process is disclosed for the preparation of low molecular weight, essentially 100 percent solids, liquid, acrylic-based resins by adding substantially all of the monomeric precursors to a polymerization medium containing a high boiling solvent or solvents over a period of at least 30 minutes and maintaining the reaction temperature above about 150° C. The polymerization medium may then be removed by temperature and/or vacuum application resulting in low molecular weight polymers useful in coating applications.

6 Claims, No Drawings

LOW MOLECULAR WEIGHT ACRYLATES OR METHACRYLATES AND METHODS FOR THEIR PREPARATION

CROSS-REFERENCE TO RELATED APPLICATIONS

This application is a continuation of application Ser. No. 666,527, filed Mar. 12, 1976, now U.S. Pat. No. 4,075,242, which is a continuation-in-part of U.S. patent application, Ser. No. 380,314, filed on July 18, 1973, now abandoned, and U.S. patent application, Ser. No. 521,723, filed Nov. 7, 1974, now abandoned.

BACKGROUND OF INVENTION

With recent concerns for volatile solvent pollution in the atmosphere, many studies have been undertaken to determine the safest types of solvents which may be emitted. However, all organic solvents are polluting to some extent and in the final analysis, organic coating systems which utilize a minimum amount of solvent are preferred.

The search for methods of making high solids coatings has been long and difficult. On the one hand, attempts to make extremely high molecular weight non-sintering coatings have involved the use of powder-coating technology, whereby the solvent is driven off by any of several different means, leaving behind a polymeric powder which may then be sprayed onto the coating substrate. This method has been hampered by the difficulties in developing non-sintered polymers and by the expensive equipment needed to prepare and apply these coatings.

It has been proposed in U.S. Pat. No. 3,028,367 to prepare low molecular weight acrylate co-polymers by utilizing organic thiol compounds. However, these products have offensive odors, poor color, and do not stand up well under exterior exposure. In addition, the products prepared require such high amounts of thiol catalysts that the backbone composition of the polymer is substantially modified by the incorporation of the thiol monomer.

U.S. Pat. No. 3,080,348 has suggested that the molecular weight of styrene-acrylate systems may be reduced by increasing reaction temperatures. However, this patent does not involve attempts to prepare molecular weights in the range of those prepared in the instant invention (750 to 5,000), and does not involve tri-component systems as are generally described herein.

It is therefore an object of this invention to prepare essentially solvent-free acrylic resins which exhibit few of the polluting characteristics exhibited by prior art solution and dispersion acrylic systems.

It is another object of this invention to overcome the practical difficulties exhibited by powder coating systems.

It is yet another object of this invention to prepare low molecular weight liquid coating materials which may be utilized at essentially 100 percent solids in presently existing coating application equipment.

Another object of this invention is to prepare low molecular weight acrylate-based polymers having improved exterior durability and odor characteristics.

Yet another object of this invention is to prepare acrylate-based polymers having much lower molecular weight than is suggested in the prior art.

SUMMARY OF INVENTION

Substantially all of the prior art problems are overcome by the preparation of the coating systems of the instant invention. Basically this invention involves polymerizing suitable co-polymers at temperatures in excess of about 150° C. The particular monomers are added to a reaction vessel containing a substantial portion of the reaction solvent over a period of at least 30 minutes, and final polymerization solids are maintained above about the 30% level. The boiling point of the polymerization solvent or solvents utilized is at least about 150° C.

In addition to acrylate monomers, the liquid polymers of the instant invention can be formed from free hydroxy or acid-containing functional monomers which render the low molecular weight co-polymers of this invention capable of being crosslinked. Other ethylenically unsaturated monomers may also be utilized.

DESCRIPTION OF INVENTION

The co-polymers of the instant invention are thermosetting in nature, i.e., contain sites having functional groups which may be crosslinked through heat reaction with a crosslinking agent.

Preferably the co-polymers of the instant invention should contain either or both free hydroxy or free acid-containing monomers of sufficient amount (generally about 1 to 30 weight percent of the entire polymer backbone) to allow crosslinking of the polymers of the instant invention.

The polymers prepared herein are liquid in nature. In other words, the polymers of this invention are of sufficiently low molecular weight (about 750 to 5000 number average molecular weight ($M_n$) as determined by vapor phase osmometry) that the compositions of the instant invention may be utilized alone without solvents in coating applications. In most all cases, the viscosity of coatings formulating using pigments and other normal coatings components with the compositions of this invention, will be of sufficiently low viscosity to allow their use without further modification. For purposes of this invention, a polymer is considered to be liquid if it has a Gardner-Holdt viscosity measured at 25° C. of less than about Z-6.

The polymers of the instant invention should also contain at least about 20 weight percent of an alkyl ester of acrylic or methacrylic acid. These esters can be represented by the general formula:

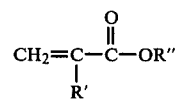

wherein R' is a hydrogen atom or a methyl group and R" is an alkyl group having from one to eight carbon atoms. Such esters include methyl, ethyl, propyl, isopropyl, butyl, isobutyl, amyl, isoamyl, hexyl, heptyl, 2 ethylhexyl, and octyl acrylates and methacrylates.

In addition to the above acrylate or methacrylate ester monomer, the copolymers of the instant invention can contain other ethylenically unsaturated monomers which are polymerizable therewith. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms. Likewise, the various esters of polymerizable acids such as crotonic, itaconic, fumaric acid and maleic acids may be utilized.

Acrylonitrile, methacrylonitrile, acrylamide, methacrylamide, 2 methylstyrene, allyl acetate, glycidyl methacrylate, t-butylaminoethyl methacrylate, hydroxyalkyl acrylates or methacrylates, such as hydroxyethyl methacrylate, hydroxypropyl methacrylate or acrylate, hydroxyethyl vinyl ether, hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene and the like can also be used as the comonomers herein.

Generally any ethylenically unsaturated aliphatic hydroxy-containing monomer may be utilized in the amounts set forth above in the instant invention. However, more preferred are the hydroxy acrylates and methacrylates having the general formula:

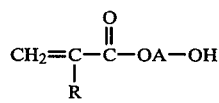

wherein R is a hydrogen atom or methyl group and A is an alkylene group containing two to six carbon atoms. Examples of these monomers are hydroxyethyl acrylate or methacrylate, hydroxypropyl acrylate or methacrylate, and hydroxyhexyl acrylate or methacrylate. Generally, these monomers can be prepared by reacting epoxide-containing molecules, such as propylene oxide or ethylene oxide, with polymerizable acids, such as methacrylic or acrylic acid.

In addition to, or in lieu of, the hydroxy-containing monomer is an ethylenically unsaturated polymerizable acid-containing monomer. Preferably this monomer is selected from the group consisting of acrylic acid, methacrylic acid, crotonic acid, and itaconic acid, although other acids can also be utilized.

Most preferably in the instant invention, up to about 30 percent, by weight, of the acid-containing monomer should be utilized in the polymer preparation.

Where acrylate- or methacrylate-containing hydroxy or acid-containing monomers are utilized, their percentage may be added to the percentage of the acrylate or methacrylate ester monomer to determine the total amount of acrylic or methacrylic monomer present.

Most preferred among the systems utilized in the instant invention are polymers containing 10 to 80 weight percent styrene or methyl methacrylate, 10 to 50 weight percent of another acrylic monomer, 5 to 40 weight percent of a hydroxy-containing monomer, and 1 to 5 weight percent of an acid-containing monomer.

Generally, any type of free radical-containing initiator or free radical liberating agent may be employed in the process of the instant invention, although it is not required. Included are benzoyl peroxide, tertiary butyl peroctoate, tertiary butyl perbenzoate, tertiary butyl hydroperoxide, cumyl hydroperoxide, dicumyl peroxide, ditertiary butyl peroxide, and the like. Surprisingly, while the instant invention requires its polymerization to be carried out above about 150° C., initiators having extremely short pot lives may be utilized without detriment. Most preferred among the initiators are ditertiary butyl peroxide and dicumyl peroxide.

The initiator should be added to the reaction over at least 30 minutes and preferably over the same period of time that the monomer is added. Initiator levels should vary from about 0.5 percent to 10 percent, based on the total monomer weight, preferably 0.5 to 5 percent.

In carrying out the process of the instant invention, substantially all, i.e., at least 75 percent, by weight, of the solvent to be utilized in the reaction is added to the reaction vessel and heated to the desired temperature. In choosing the amount of solvent to be utilized, the final reaction solids, after all monomers have been added, should be no lower than about 30 percent, preferably about 45 to 60 percent solids, based on the total weight of the solvent and polymer.

Any high boiling (above about 150° C.) solvent may be utilized to prepare the low molecular weight acrylate polymers of the instant invention. Examples of high boiling solvents include the aromatic alcohols, such as phenethyl alcohol, benzyl alcohol, the toluene alcohols, and the like. Other high boiling solvents include the alcohol and glycol ethers, esters and mixed ethers and esters, such as diethylene glycol, Cellosolve ® acetate (registered trademark of the Union Carbide Corporation), butyl Cellosolve, Cellosolve, the Carbitols ® (registered trademark of the Union Carbide Corporation), and the like. In addition, some glycols may also be utilized as the reaction solvent including ethylene and propylene glycols and their various dimers and trimers. Higher boiling aliphatic alcohols such as 2-ethylhexanol may also be utilized. In addition, high boiling hydrocarbon fractions can also be utilized, with the most preferred being Solvesso ® 150 or Solvesso ® 100 (a registered trademark of the Humble Oil and Refining Company). In any event, however, the boiling point of the solvent should be above about 150° C.

The most preferred among all the polymerization solvents is benzyl alcohol. This solvent produces polymers having surprisingly low molecular weights and viscosities when compared to the other identified high boiling solvents. The use of as much as 75%, by weight, of another high boiling solvent in conjunction with benzyl alcohol produces the superior molecular weight and viscosity results. Most preferably, however, the reaction solvent comprises all benzyl alcohol.

Substantially all of the solvent is added to the reaction flask and is heated to the desired reaction temperature—in excess of about 150° C. At this point, an addition of substantially all of the monomer is begun. Minor amounts, i.e., up to about 20 percent, by weight, of the total monomer weight may be placed in the reaction vessel with the solvent. The addition is carried out over at least about thirty minutes. Not all of the monomers need be mixed together; rather separate additions of different monomers or different ratios of different monomers, may be used. Preferably, the addition time should be in the range of about 1 to 10 hours, most preferably 2 to 6 hours.

The initiators which are utilized in the instant invention may be either mixed with the monomer or added separately over the general period of the monomer addition. In view of the high reaction temperature involved, addition of any major amount of the initiator to the solvent prior to the addition of the monomer will be of little or no effect.

Addition times of both initiators and monomers may vary and the various monomers may be added over regular periods of time, periodically, or over gradually increasing or decreasing periods of time, as long as the total amount of monomer addition is substantially within the ranges indicated.

During the course of the reaction, the reaction temperature may vary. However, in all cases, it should be maintained above at least 150° C., preferably 160° C., and most preferably, between 170° and 215° C.

The reactions of the instant invention are preferably carried out under ambient pressure conditions.

Reaction temperature should be maintained within the desired temperature ranges following monomer addition for a time sufficient to cause conversion of all the monomer to polymer. This is usually measured by determining the solids content of the reaction mixture by measuring the amount of solvent that evaporates, when test samples are held for about 20 minutes at 220° C. When the solids content is empirically determined to be at least about 85 percent, by weight, preferably at least about 98 percent, by weight, of theoretical, the reaction is deemed complete. The term "solids content" does not refer to whether the polymer prepared herein is liquid or solid in nature, but rather refers to the amount of material which is left behind after the evaporation for 20 minutes at 220° C., above. Thus, the term "solids content" is synomous with the term "percent non-volatile mixture" or "percent NVM" at 220° C. for 20 minutes.

At this point, it is necessary that the reaction solvent be removed by either increasing the heat or applying a vacuum or both. Usually this solvent stripping procedure requires up to about two hours and should be considered complete when 90 to 95% of the solvent has been removed. It is preferred that vacuum be utilized in addition to heat to minimize heat degradation of the polymer.

The polymers prepared by the process of the instant invention exhibit molecular weights in the range of about 750 to 5000, generally about 750 to 2000, and are liquid in nature.

Because of the liquid nature of the low molecular weight polymers of the instant invention, they may be utilized in any of a varied number of end applications. For example, they may be used as plasticizers for rigid, inflexible polymeric systems. In addition, they may be utilized in combination with curing agents to form films and plastic articles, and as binders and sizes. Perhaps the most useful end use of these polymers is in the coatings area where they are combined with curing agents, applied to the desired substrate and baked, or otherwise cured.

Examples of the curing agents which may be utilized for preparing crosslinked polymeric products include polyepoxides, di-isocyanates and urea-aldehyde, benzoguanamine-aldehyde, or melamine-aldehyde condensation products and the like. Particularly desired are the melamine-formaldehyde condensation products, such as polymethoxymethyl melamines, preferably the hexamethoxymethyl melamines. When melamine-formaldehyde or urea-formaldehyde curing agents are utilized, it is preferred that an acid catalyst, such as toluene sulfonic acid, be employed to increase the cure rate.

By utilizing these polymers essentially solvent-free coatings systems may be obtained having handleable viscosities at room temperature, which systems are applicable in standard industrial coating processes, including hot spraying, roll coating, and the like.

The products prepared from the process of the instant invention may be formulated into coating systems by the addition of solvents, fillers, pigments, flow control agents, and the like. These coating systems may be prepared using standard coating preparation techniques.

The baking of the acid catalyzed systems of the instant invention may be carried out over a wide range of temperatures, depending upon the curing agent and the catalyst selected. Generally, however, temperatures below about 250° C. should be utilized, so as to reduce the possibility of yellowing in the finished film.

In the following examples, all parts and percentages are by weight, unless otherwise indicated.

EXAMPLE 1

To a reaction flask equipped with a stirrer, reflux condenser, thermometer and dropping funnel, are added 300 parts of benzyl alcohol. This is heated to 201° C. and over a four hour period a solution of 210 parts of ethyl acrylate, 90 parts hydroxy ethyl acrylate, and 15 parts of ditertiary butyl peroxide are added. At the end of the addition, the contents of the flask are refluxing at approximately 150° C. Reaction for an additional hour at this temperature produces theoretically complete monomer to polymer conversion. Essentially all the benzyl alcohol is stripped off under vacuum at 1 to 10 mmHg at a temperature of 204° C. There results a resin having a solids percent of 97.8, a Gardner Holdt 25° C. viscosity of H at 80 percent solids in methyl Cellosolve, and a Gardner color of less than 1. The polymer mixture was handleable and liquid at room temperature.

EXAMPLES 2–6

Utilizing the same procedure the same polymer was prepared in various solvents with the results as shown below:

| Example | EA[7] | HEA[8] | Solvent | %NVM[1] | Gardner-Holdt Visc.[2] |
|---|---|---|---|---|---|
| 2 | 70 | 30 | Benzyl alcohol | 98 | H |
| 3 | 70 | 30 | DOW DPM[3] | 90 | N-O |
| 4 | 70 | 30 | Bu. Cell.[4] | 96 | M |
| 5 | 70 | 30 | 2-EHA[5] | 99 | S-T |
| 6 | 70 | 30 | 75% X. 150[6] 25% Dow DPM | 94 | U-V |

[1]Percent non-volatile mixture or solids after stripping.
[2]Viscosity at 80% solids in Butyl Cellosolve at 25° C.
[3]Dowanol DPM - propylene glycol methyl ether.
[4]Butyl Cellosolve.
[5]2-Ethylhexanol.
[6]Solvesso 150/
[7]Ethyl acrylate
[8]Hydroxyethyl acrylate.

As can be seen from the above examples a lower viscosity polymer results from preparation of the above products in benzyl alcohol. However, in each case, the polymers were liquid at room temperature.

EXAMPLE 7

1500 parts of benzyl alcohol are heated to 185° C. in a stirred reaction vessel having a reflux condenser. A monomer mixture, containing 555 parts of styrene, 600 parts of n-butyl acrylate, 315 parts of hydroxypropyl acrylate, 30 parts of methacrylic acid, and 75 parts of dicumylperoxide, is added over a period of six hours and ten minutes. The temperature is maintained at 185° C. and the stirring continued at the same rate during the addition. After a brief period of heating at 185° C., the solvent is stripped to give a resinous material whose viscosity at 90 percent solids in xylene at 70° C. is 180 centipoise. The stripped material, although viscous, does flow at room temperature and is of sufficiently low viscosity to be formulated into a coating. The material forms a glossy, clear, colorless, and durable coating when 10 parts of it are blended with 4.28 parts Cymel 300 (American Cyanamide Co.), the mixture drawn down on a steel panel, and baked at 130° C. for 20 minutes. This coating has a pencil hardness of H and is unaffected by the application of xylene for one minute.

EXAMPLE 8

450 parts of benzyl alcohol were placed in a reaction flask equipped as in Example 1. A monomer mixture consisting of 70 parts of styrene, 81.6 parts of n-butyl acrylate, 48.3 parts of hydroxypropyl acrylate, and 4.2 parts of methacrylic acid, was added over a five-hour period with reaction temperature maintained at 192°-200° C. The solution was post-heated at that temperature for one hour further. After stripping the benzyl alcohol, a resin was obtained having a 4.11 poise viscosity at 70° C. in 90 percent, by weight, xylene solution. The resin as prepared was liquid and flowed at room temperature.

EXAMPLES 9–14

Monomer solutions, containing 37 parts of styrene, 40 parts of n-butyl acrylate, 21 parts of hydroxypropyl acrylate, 2 parts of methacrylic acid, and 5 parts of dicumyl peroxide were added over 3 hours at about 180° C. to 100 parts of solvent having the composition listed below:

| Number | Parts Benzyl Alcohol | Parts Diethylene- glycol | Viscosity (Poise) | Molecular Weight $\overline{M}_n$ |
|---|---|---|---|---|
| 9 | 100 | 0 | 2.0 | 700 |
| 10 | 75 | 25 | 3.5 | 800 |
| 11 | 50 | 50 | 3.7 | |
| 12 | 25 | 75 | 4.6 | 1000 |
| 13 | 10 | 90 | 9.0 | |
| 14 | 0 | 100 | 14.0 | 1250 |

After monomer addition was completed, the reaction was heated for one additional hour, following which the solvents were stripped under vacuum with heating until no further distillate was obtained. Viscosities were determined at 90 percent solids in xylene using a concentric tube viscometer at 70° C. The resins as prepared were liquid at room temperature.

The above examples are meant only to be illustrative and are not intended as limits on the appended claims.

What is claimed is:

1. A process for preparing low molecular weight, room temperature liquid acrylate or methacrylate resins from monomers about 20 to 100 weight percent of which are selected from acrylate and methacrylate esters having the general formula:

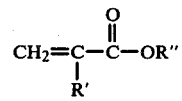

wherein R' is hydrogen or methyl and R" is $C_1$–$C_8$ alkyl or mixtures thereof and about 0 to about 80 weight percent of which are selected from ethylenically unsaturated monomers copolymerizable therewith, which comprises:

A. heating to above about 150° C. at least 75 percent, by weight based on the total reaction solvent, of a hydrocarbon reaction solvent having a boiling point of above about 150° C. in a batch reactor;

B. adding at a temperature of above about 150° C. said monomers and the remaining solvent to the reactor over at least about 30 minutes so that the final polymerization solids of the reaction medium is above at least 30 weight percent;

C. maintaining the reaction above about 150° C. for a time sufficient to polymerize said monomers to a monomer to polymer conversion percentage of at least about 85 percent, by weight; and D. stripping off substantially all of the reaction solvent.

2. The process of claim 1 wherein said monomers are added with a polymerization initiator.

3. The process of claim 1 wherein the reaction temperature is maintained above about 160° C.

4. The process of claim 1 wherein the reaction temperature is maintained between about 170° and 215° C.

5. The process of claim 1 wherein the monomers are added over a period of about two to six hours.

6. The process of claim 1 wherein the reaction is carried out at a solids level of about 45 to about 60 percent by weight.

* * * * *